US010035055B2

(12) United States Patent
Smith et al.

(10) Patent No.: US 10,035,055 B2
(45) Date of Patent: Jul. 31, 2018

(54) GOLF CLUB RACK

(71) Applicants: Steve Smith, Phenix City, AL (US);
Mason H. Smith, Phenix City, AL (US)

(72) Inventors: Steve Smith, Phenix City, AL (US);
Mason H. Smith, Phenix City, AL (US)

(*) Notice: Subject to any disclaimer, the term of this patent is extended or adjusted under 35 U.S.C. 154(b) by 21 days.

(21) Appl. No.: 15/410,173

(22) Filed: Jan. 19, 2017

(65) Prior Publication Data

US 2017/0203169 A1 Jul. 20, 2017

Related U.S. Application Data

(60) Provisional application No. 62/280,182, filed on Jan. 19, 2016.

(51) Int. Cl.
*A63B 55/10* (2006.01)
*B62B 3/10* (2006.01)
*A63B 55/60* (2015.01)

(52) U.S. Cl.
CPC .............. *A63B 55/10* (2013.01); *B62B 3/102* (2013.01); *A63B 55/60* (2015.10); *A63B 2209/00* (2013.01); *B62B 2202/406* (2013.01)

(58) Field of Classification Search
CPC ..... A63B 55/10; A63B 55/60; A63B 2209/00; B62B 3/102; B62B 2202/406; B62B 1/262; Y10S 280/06
See application file for complete search history.

(56) References Cited

U.S. PATENT DOCUMENTS

| | | | | | |
|---|---|---|---|---|---|
| 2,950,748 | A | * | 8/1960 | Olinghouse | A63B 55/60 221/279 |
| 2,992,012 | A | * | 7/1961 | Herold | B62B 1/262 211/70.2 |
| 3,164,393 | A | * | 1/1965 | Upham, II | B62B 1/262 211/70.2 |
| 3,165,330 | A | * | 1/1965 | Cotton | B62B 1/262 280/13 |
| 3,265,106 | A | * | 8/1966 | Jarman | B62B 1/262 206/315.6 |
| 3,360,279 | A | * | 12/1967 | Hunt | B62B 1/262 280/35 |
| 3,738,677 | A | * | 6/1973 | Renock | A63B 55/60 280/37 |
| 3,883,150 | A | * | 5/1975 | Varela | B62B 1/262 280/47.19 |

(Continued)

*Primary Examiner* — Corey Skurdal
(74) *Attorney, Agent, or Firm* — Jones IP Law, LLC; Dennis W. Jones

(57) ABSTRACT

A golf club rack for transport and organization of golf clubs, via securement of the golf club rack to a cart, is provided, that includes lower and upper tubular horizontal members, end braces for each, and tubular vertical members extending between the end braces, the lower tubular horizontal members also including a plurality of sockets with openings for insertion of a golf club handle, and a platform attached to the upper tubular horizontal member and including clips for securing a golf club thereto, whereby respective golf clubs inserted into a respective socket opening, and extending toward the upper tubular horizontal member are securable to a respective clip.

11 Claims, 5 Drawing Sheets

(56) References Cited

U.S. PATENT DOCUMENTS

| | | | | |
|---|---|---|---|---|
| 4,126,327 A | * | 11/1978 | Taber | A63B 55/10 |
| | | | | 211/120 |
| D280,859 S | * | 10/1985 | Ott | D34/15 |
| D330,275 S | * | 10/1992 | West | D34/15 |
| 5,226,666 A | | 7/1993 | Dinkens, Jr. | |
| 5,829,604 A | | 11/1998 | Brophy | |
| 2009/0145787 A1 | * | 6/2009 | Grander | A45F 3/04 |
| | | | | 206/315.6 |
| 2012/0261447 A1 | * | 10/2012 | Bryant | B60R 9/08 |
| | | | | 224/274 |

* cited by examiner

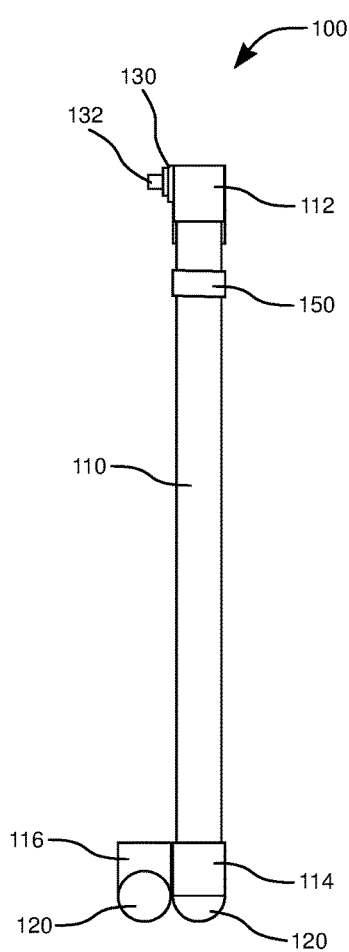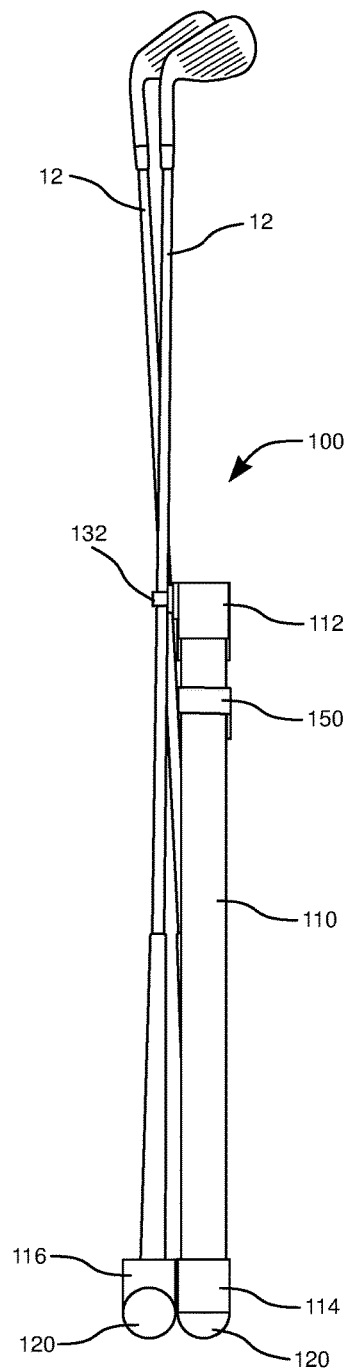
Fig. 4-A  Fig. 4-B

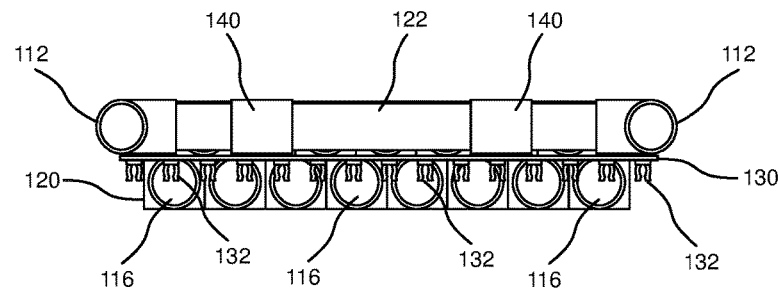
Fig. 5-A
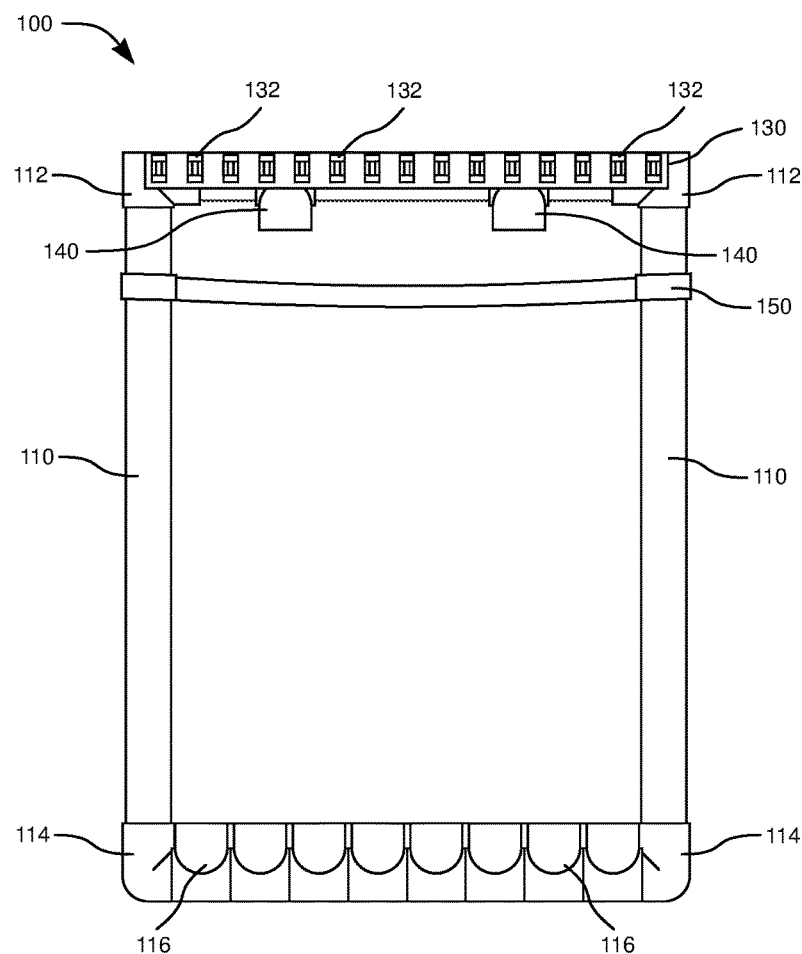
Fig. 5-B

GOLF CLUB RACK

CROSS-REFERENCE TO RELATED APPLICATIONS

This application claims the benefit of U.S. Provisional Application No. 62/280,182, entitled "Master Kaddy Golf Rack," filed Jan. 19, 2016, which is incorporated herein by reference as if set forth herein in its entirety.

BACKGROUND

This invention pertains to a rack for use with golf clubs. More particularly, this invention pertains to a golf club rack that provides for storage and organization of golf clubs. The golf club rack also provides for removable attachment to a push type golf cart, a pull type golf cart, or to the rear of a riding cart.

The game of golf requires a continual changing of the golf club to be used due to the current game situation, the location of the ball prior to an upcoming shot, and to the particular golfer's strengths and weaknesses resulting from the game situation, and the present lie of the ball. Golf clubs are often carried or transported in a golf bag, thus causing a potential organizational problem for each shot. Locating the desired club can be problematic since the golfer is unlikely to place the club in the same or consistent location within the bag after use, and also since the clubs tend to move around within the bag during play and/or movement of the golf bag. Damage to the clubs due to the movement within the golf bag and/or due to dropping the golf bag are possible concerns. Additional concerns are created by the weight of the golf bag during play. It is desirable to have a way of transporting and organizing golf clubs that minimizes the weight issue and eliminates other organizational problems associated with a golf bag.

BRIEF SUMMARY

A golf club rack for transport and organization of golf clubs, via securement of the golf club rack to a cart or other structure, is provided, that includes lower and upper tubular horizontal members, end braces for each, and tubular vertical members extending between the end braces, the lower tubular horizontal members also including a plurality of sockets with openings for insertion of a golf club grip, and a platform attached to the upper tubular horizontal member and including clips for securing a golf club thereto, whereby respective golf clubs inserted into a respective socket opening, and extending toward the upper tubular horizontal member are securable to a respective clip.

According to one embodiment of the present invention, is a golf club rack for transport and organization of golf clubs, via securement of the golf club rack to various type golf carts and structures, includes (1) a first lower tubular horizontal member and an upper tubular horizontal member, (2) a first lower end brace and a second lower end brace, each lower end brace attached to opposite ends of the first lower tubular horizontal member, (3) a first upper end brace and a second upper end brace, each upper end brace attached to opposite ends of the upper tubular horizontal member, (4) a first tubular vertical member and a second tubular vertical member, the first tubular vertical member extending from the first lower end brace to the first upper end brace, and the second tubular vertical member extending from the second lower end brace to the second upper end brace, forming a rectangular rack structure, (5) a second lower tubular horizontal member adjacent to and attached to the first lower tubular horizontal member, (6) the first lower tubular horizontal member and the second lower tubular horizontal member each further including a plurality of sockets, each socket including an opening directed toward the upper tubular horizontal member, each opening sized for insertion of a golf club handle into the opening, and (7) a platform member attached to the upper tubular horizontal member, the platform member having a length adjacent the upper tubular horizontal member, the platform including a plurality of clips along the length, for securing a respective golf club within a respective clip, whereby respective golf clubs inserted into a respective socket opening, and extending toward the upper tubular horizontal member are securable to a respective clip.

In one embodiment, the sockets of the respective lower horizontal tubular member are offset from corresponding sockets of the other lower horizontal tubular member.

In another embodiment, pivot members are located between the upper end braces of the upper horizontal tubular members for providing stability with attachment to external structures or devices.

In one embodiment, each clip along the rectangular platform correspond to a respective socket of the plurality of sockets.

In one embodiment, a strap is attached between the respective vertical tubular members for securing the golf club rack to a cart or other structure.

In various embodiments, the respective horizontal and vertical tubular members are made from lightweight hard plastic tubes that are connected to each other with the respective upper and lower end braces. The upper end braces and the lower end braces include openings into which the respective tubular members are inserted and attached. In other embodiments, the respective horizontal and vertical tubular members, as well as the upper end braces and the lower end braces, are made from lightweight metals, such as aluminum, aluminum alloys, and such like.

It should be appreciated that various materials capable of forming tubular structures to provide rigidity in the frame structure can be used without departing from the spirit and scope of the present invention.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIG. 4-A is a side view of the golf club rack of FIG. 3;

FIG. 4-B is a side view of the golf club rack of FIG. 3 including golf clubs removably secured to the golf club rack;

FIG. 5-A is a top view of the golf club rack of FIG. 3; and
FIG. 5-B is a front view of the golf club rack of FIG. 3.

DETAILED DESCRIPTION

A golf club rack suitable that provides for storage and organization of golf clubs, and for use with various type golf carts and other structures is disclosed. The golf club rack also provides for removable attachment to a stationary stand, to a push type golf cart, to a pull type golf cart, or even to the rear of a riding type cart.

A golf club rack for transport and organization of golf clubs, via securement of the golf club rack to various type structures such as golf carts, includes lower and upper tubular horizontal members, end braces for each, and tubular vertical members extending between the end braces, the lower tubular horizontal members also including a plurality of sockets with openings for insertion of a golf club grip, and a platform attached to the upper tubular horizontal member and including clips for securing a golf club thereto, whereby respective golf clubs inserted into a respective socket opening, and extending toward the upper tubular horizontal member are securable to a respective clip.

Figure 1:
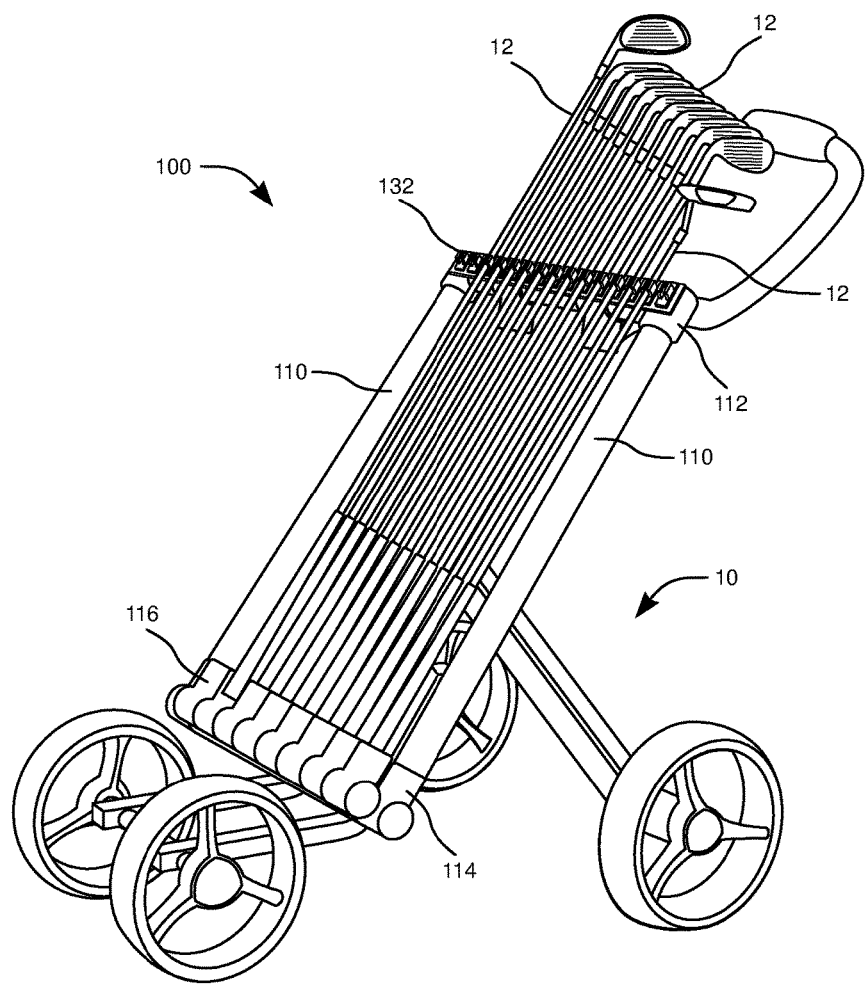
FIG. 1 is a perspective view of a golf club rack in use attached to a golf cart.
Figure 2:
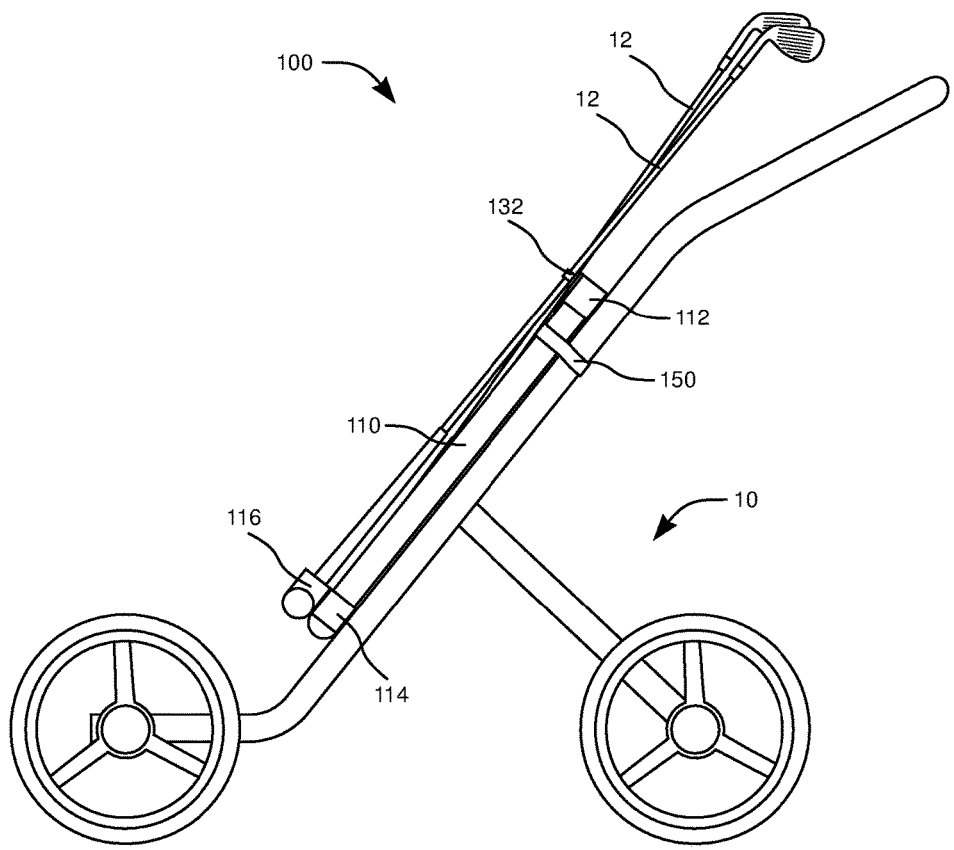
FIG. 2 is a side view of the golf club rack of FIG. 1 in use attached to a golf cart.

FIG. 1 is a perspective view of a golf club rack 100 attached to a golf cart 10. FIG. 2 is a side view of the golf club rack 100 attached to the golf cart 10. In practice, the golf club rack 100 is removably attachable and securable to various type golf carts, such as a push type golf cart, a pull type golf cart, or even to a riding type golf cart or other structure. Utilizing the golf club rack 100 as shown, the golf clubs 12 can be arranged in an organized fashion according to the golfer's preference. In the illustrated embodiment, a driver is placed at one end of the available locations, and the irons are distributed in descending order toward the putter at the opposite end of the available locations. Of course, the arrangement of the clubs 12 is left completely to the golfer's discretion. The grip of each club 12 is situated in a respective socket 116 or receptacle (as described below) and the shaft is secured into a clip 132 so that the head is readily visible for ease in selecting an appropriate club. The arrangement provides for ease in selecting a desired club 12 according to its location within the golf club rack 100.

Figure 3:
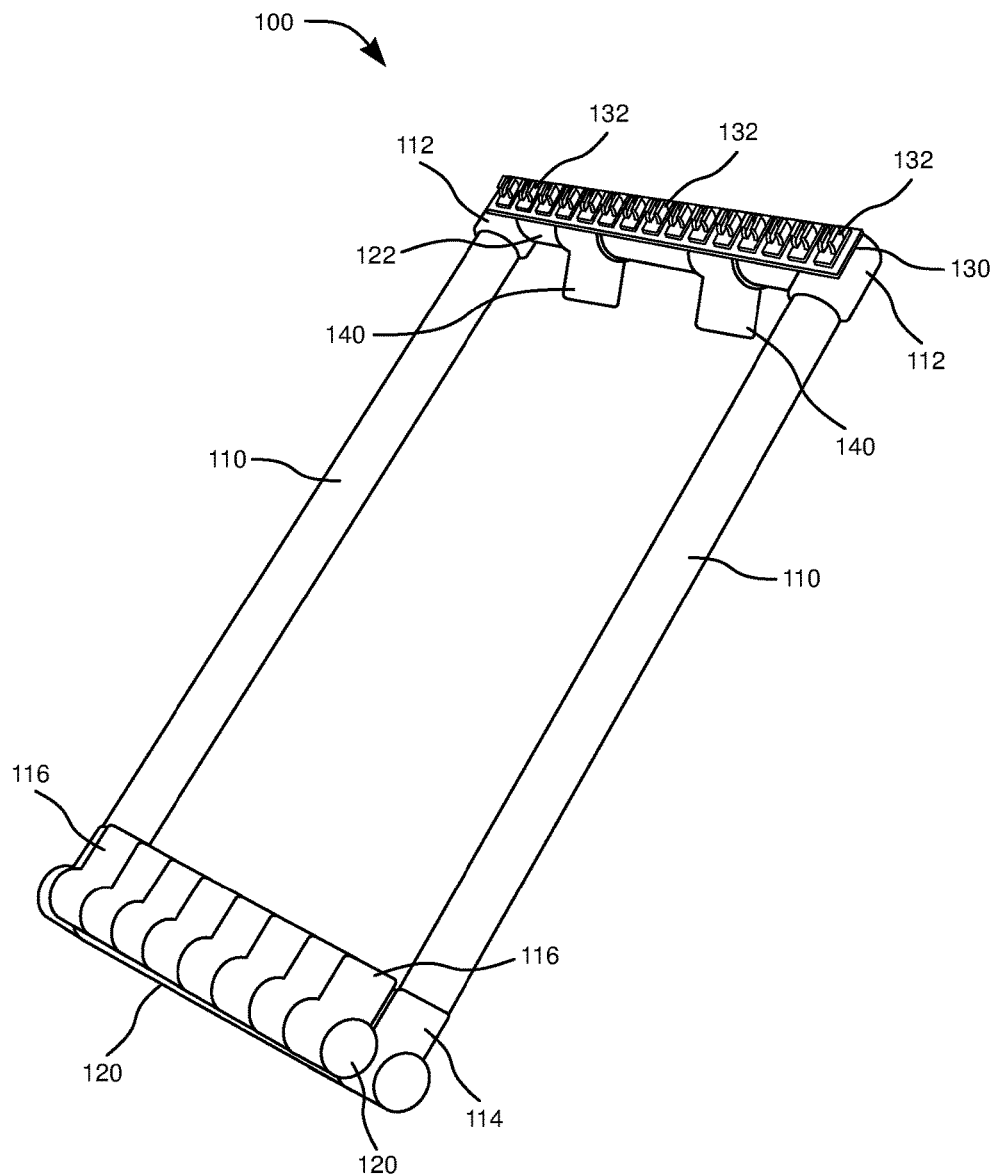
FIG. 3 is a perspective view of the golf club rack of FIG. 1.

FIG. 3 is a perspective view of the golf club rack 100. The golf club rack 100 includes tubular members arranged to form a frame structure. A first lower horizontal tubular member 120 includes a lower end brace 114 at each end. A second lower horizontal tubular member 120 is arranged adjacent the first lower horizontal tubular member 120. A pair of vertical tubular members 110 extend upward from each respective end brace 114 toward an upper horizontal tubular member 122. The upper horizontal tubular member 122 includes an upper end brace 112 at each end. Each vertical tubular member 110 is attached to a respective upper end brace 112 opposite the corresponding lower end brace 114 at the respective end of the first lower horizontal tubular member 120. The first lower horizontal tubular member 120, together with the upper horizontal tubular member 122, the pair of vertical tubular members 110, together with the corresponding lower end braces 114 and the upper end braces 112, combine to form the frame structure of the golf club rack 100. In the illustrated embodiments, the respective horizontal and vertical tubular members are made from lightweight hard plastic tubes that are connected to each other with the respective upper and lower end braces. The upper end braces 112 and the lower end braces 114 include openings into which the respective tubular members are inserted and attached. In other embodiments, the respective horizontal and vertical tubular members, as well as the upper end braces 112 and the lower end braces 114, are made from lightweight metals, such as aluminum, aluminum alloys, and such like.

Both the first and second lower horizontal tubular members 120 include a plurality of sockets 116. In one embodiment, each of the lower horizontal tubular members 120 extend through a respective grouping of the plurality of sockets 116. In another embodiment, the plurality of sockets 116 are formed to attach to the lower horizontal tubular members 120. In either event, the plurality of sockets 116 include an opening oriented toward the upper horizontal tubular member 122 of the upper portion of the frame structure of the golf club rack 100.

The upper horizontal tubular member 122 of the golf club rack 100 includes a rectangular platform 130 adjacent the upper horizontal tubular member 122 and extending between the upper end braces 112 at each end of the horizontal tubular member 122. The rectangular platform 130 includes a plurality of clips 132. The clips 132 are arranged openings that align with respective openings of corresponding sockets of the plurality of sockets 116 at the first and second horizontal tubular members 120 of the golf club rack 100.

A pair of pivot members 140 are attached to the upper horizontal tubular member 122. Each pivot member 140 rotates or pivots to provide for adjustability in attaching the golf club rack to any external stand or structure, such as a stationary stand, a push type golf cart, a pull type golf cart, a riding type golf cart, or any other structure to which the pivot member 140 can be aligned. In the illustrated embodiment, each pivot member 140 includes an opening opposite the upper horizontal tubular member 122 into which any protrusion from the external structure may be inserted, thus allowing the golf club rack 100 to rest on the respective external structure. Of course, the pivot members 140 are made from the same material as the remainder of the tubular members of the golf club rack 100 in any particular embodiment.

FIG. 4-A is a side view of the golf club rack 100 and FIG. 4-B is a side view of the golf club rack 100 illustrating golf clubs 12 removably secured to the golf club rack 100. FIG. 5-A is a top view of the golf club rack 100 and FIG. 5-B is a front view of the golf club rack 100. In the illustrated embodiment, a vertical tubular member 110 extends upward from a lower end brace 114 toward an upper end brace 112. In the illustrated embodiment, the vertical tubular member 110 extends into the lower end brace 114 and into the upper end brace 112. An end view of the pair of lower horizontal tubular members 120 illustrates that the lower horizontal tubular members are adjacent each other. An end view of the plurality of sockets 116 is illustrated above the second or front lower horizontal tubular member 120.

As noted above, the respective horizontal and vertical tubular members are made from lightweight hard plastic tubes that are connected to each other with the respective upper and lower end braces. In other embodiments, the respective horizontal and vertical tubular members, as well as the upper end braces 112 and the lower end braces 114, are made from lightweight metals, such as aluminum, aluminum alloys, and such like.

An end view of the rectangular platform 130 is illustrated and extending between the upper end braces 112 at each end of the upper horizontal tubular member 122. A side view of a clip 132 is illustrated as attached to the rectangular platform 130. The plurality of clips 132 extends into the page and parallel to the rectangular platform 130 and the upper horizontal tubular member 122.

The grip of a golf club 12 is shown extending into a socket 116 (receptacle) of the second lower horizontal tubular member 120 and secured with a clip 132. The grip of a second golf club 12 is shown behind the first golf club 12 and extending into a socket 116 (receptacle) of the first lower horizontal tubular member 120 behind the vertical tubular member 110 and also secured via a clip 132 that is behind the visible clip 132 of the drawing.

Both the first and second lower horizontal tubular members 120 include a plurality of sockets 116. The top view of the golf club rack 100 shown in FIG. 5-A illustrates the openings of the sockets 116. The sockets 116 of the second (front) lower horizontal tubular member 120 are offset from the sockets 116 of the first (rear) lower horizontal tubular member 120 that are partially visible below the upper horizontal tubular member 122. As is evident in FIG. 5-A and FIG. 5-B, the openings of each socket 116 are oriented toward the clips 132 attached to the rectangular platform 130 that extends adjacent the upper horizontal tubular member 122 and between the upper end braces 112. Of course, in one embodiment, each clip 132 corresponds to a respective socket of the plurality of sockets 116. It should be noted that the actual number of sockets 116 and clips may vary according to design choice utilized for making or assembling the golf club rack 100.

The golf club rack 100 also includes a strap 150 extending between the vertical tubular members 110 for securing the golf club rack to a cart. In various embodiments, the strap 150 provides for attachment at the vertical tubular members 110 at either end of the strap 150, or alternatively between the ends of the strap 150 to attach to the respective cart. In various embodiments, the strap 150 includes buckles, rings, or snaps for easy fastening at a joining point between the ends, or hook and loop type fasteners for wrapping each end of the strap 150 around the vertical tubular members 110 at either or both ends of the strap 150.

The pair of pivot members 140 are illustrated in the front view attached to the upper horizontal tubular member 122. Each pivot member 140 rotates or pivots to provide for adjustability in attaching the golf club rack to any external stand or structure, such as a stationary stand, a push type golf cart, a pull type golf cart, a riding type golf cart, or any other structure to which the pivot member 140 can be aligned. In the illustrated embodiment, each pivot member 140 includes an opening opposite the upper horizontal tubular member 122 into which any protrusion from the external structure may be inserted, thus allowing the golf club rack 100 to rest on the respective external structure. The pivot members 140 are made from the same material as the remainder of the tubular members of the golf club rack 100 in any particular embodiment.

In use, the golf club rack 100 provides for transport and organization of golf clubs 12, via securement of the golf club rack 100 to various type golf carts, and includes (1) a first lower tubular horizontal member 120, and an upper tubular horizontal member 120, (2) a first lower end brace 114 and a second lower end brace 114, each lower end brace 114 attached to opposite ends of the first lower tubular horizontal member 120, (3) a first upper end brace 112 and a second upper end brace 112, each upper end brace 112 attached to opposite ends of the upper tubular horizontal member 122, (4) a first tubular vertical member 110 and a second tubular vertical member 110, the first tubular vertical member 110 extending from the first lower end brace 114 to the first upper end brace 112, and the second tubular vertical member 110 extending from the second lower end brace 114 to the second upper end brace 112, forming a rectangular rack structure, (5) a second lower tubular horizontal member 120 adjacent to and attached to the first lower tubular horizontal member 120, (6) the first lower tubular horizontal member 120 and the second lower tubular horizontal member 120 each further including a plurality of sockets 116, each socket including an opening directed toward the upper tubular horizontal member 122, each opening sized for insertion of a golf club grip into the opening, and (7) a platform member 130 attached to the upper tubular horizontal member 122, the platform member 130 having a length adjacent the upper tubular horizontal member 122, the platform member 130 including a plurality of clips 132 along its length, for securing a respective golf club 12 within a respective clip 132, whereby respective golf clubs 12 inserted into a respective socket opening 116 and extending toward the upper tubular horizontal member 122 are securable to a respective clip 132.

In one example, a driver is placed at one end of the available locations, and the irons are distributed in descending order toward the putter at the opposite end of the available locations. Of course, the golfer may begin at either edge of the golf club rack 100. Further, the arrangement of the clubs 12 is left completely to the golfer's discretion. The grip of each club 12 is situated within a respective socket 116 or receptacle and the shaft is secured into a clip 132 so that the head is readily visible for ease in selecting an appropriate club. The arrangement provides for ease in selecting a desired club 12 according to its preferred location within the golf club rack 100.

The sockets 116 of the respective lower horizontal tubular member 120 are offset from corresponding sockets 116 of the other lower horizontal tubular member 120.

Pivot members 140 are located between the upper end braces of the upper horizontal tubular members for providing stability with attachment to external structures or devices.

Each clip 132 along the rectangular platform correspond to a respective socket of the plurality of sockets 116.

A strap is attached between the respective vertical tubular members for securing the golf club rack 100 to a cart or other structure.

Those skilled in the art will recognize that materials capable of forming tubular structures to provide rigidity in the frame structure can be used without departing from the spirit and scope of the present invention.

From the foregoing description, it will be recognized by those skilled in the art that a golf club rack 100 for transport and organization of golf clubs 12, via securement of the golf club rack 100 to various type golf carts has been provided.

The golf club rack 100 provides for transport and organization of golf clubs, via securement of the golf club rack 100 to various type golf carts 10, and includes lower and upper tubular horizontal members, end braces for each, and tubular vertical members extending between the end braces, the lower tubular horizontal members also including a plurality of sockets with openings for insertion of a golf club grip, and a platform attached to the upper tubular horizontal member and including clips for securing a golf club 12 thereto, whereby respective golf clubs 12 inserted into a respective socket opening, and extending toward the upper tubular horizontal member are securable to a respective clip 132.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described, and without departing from the true spirit and scope of the present invention, which is set forth in the following claims.

What is claimed is:

1. A golf club rack for transport and organization of golf clubs, the golf club rack comprising:
   a first lower horizontal tubular member and an upper horizontal tubular member;
   a first lower end brace and a second lower end brace, each lower end brace attached to opposite ends of the first lower horizontal tubular member;
   a first upper end brace and a second upper end brace, each upper end brace attached to opposite ends of the upper horizontal tubular member;
   a first vertical tubular member and a second vertical tubular member, the first vertical tubular member extending from the first lower end brace to the first upper end brace, and the second vertical tubular member extending from the second lower end brace to the second upper end brace, forming a rectangular rack structure;
   a second lower horizontal tubular member adjacent to and attached to the first lower horizontal tubular member;
   the first lower horizontal tubular member and the second lower horizontal tubular member each further including a plurality of sockets, each socket including an opening directed toward the upper horizontal tubular member, each opening sized for insertion of a golf club grip into the opening;
   a platform member attached to the upper horizontal tubular member, the platform member having a length adjacent the upper horizontal tubular member, the platform including a plurality of clips along the length, for securing a respective golf club within a respective clip;
   whereby respective golf clubs inserted into a respective socket opening and extending toward the upper horizontal tubular member are securable to a respective clip.

2. The golf club rack of claim 1, further comprising each socket within the plurality of sockets of the second lower horizontal tubular member offset from corresponding sockets within the plurality of sockets of the first lower horizontal tubular member.

3. The golf club rack of claim 1, the upper horizontal tubular member further comprising at least one pivot member between first upper end brace and second upper end brace, each pivot member providing for stability with external structures.

4. The golf club rack of claim 1, wherein each clip corresponds to a respective socket.

5. The golf club rack of claim 1, further comprising a strap attached to the first vertical tubular member and to the second vertical tubular member, the strap providing for securing the golf club rack to a cart.

6. The golf club rack of claim 5, wherein the cart is one of a pull cart, a push cart, a riding cart.

7. The golf club rack of claim 1, wherein the clips are snap clips providing for a golf club to snap into place to remain secure within the clip.

8. The golf club rack of claim 1, further comprising tubular members formed of a lightweight metal.

9. The golf club rack of claim 8, further comprising brace members formed of a lightweight metal.

10. The golf club rack of claim 1, further comprising tubular members formed of plastic.

11. The golf club rack of claim 10, further comprising brace members formed of plastic.

* * * * *